US012643421B2

(12) United States Patent
Van Der Weijde et al.

(10) Patent No.: US 12,643,421 B2
(45) Date of Patent: Jun. 2, 2026

(54) DEVICE AND METHOD FOR MOVING A CONNECTOR OF AN ELECTRIC VEHICLE CHARGER

(71) Applicant: ROCSYS B.V, Rijswijk (NL)

(72) Inventors: Johannes Oosten Van Der Weijde, Rijswijk (NL); Kanter Van Deurzen, Rijswijk (NL); Guus Nico Paris, Rijswijk (NL); Remy Van Rooijen, Rijswijk (NL)

(73) Assignee: ROCSYS B.V., Rijswijk (NL)

( * ) Notice: Subject to any disclaimer, the term of this patent is extended or adjusted under 35 U.S.C. 154(b) by 686 days.

(21) Appl. No.: 18/032,029

(22) PCT Filed: Oct. 8, 2021

(86) PCT No.: PCT/NL2021/050613
§ 371 (c)(1),
(2) Date: Apr. 14, 2023

(87) PCT Pub. No.: WO2022/086320
PCT Pub. Date: Apr. 28, 2022

(65) Prior Publication Data
US 2023/0391214 A1 Dec. 7, 2023

(30) Foreign Application Priority Data

Oct. 20, 2020 (NL) ..................................... 2026710

(51) Int. Cl.
*B60L 53/35* (2019.01)
*B60L 53/16* (2019.01)
(52) U.S. Cl.
CPC ............... *B60L 53/35* (2019.02); *B60L 53/16* (2019.02)
(58) Field of Classification Search
CPC .................................. B60L 53/16; B60L 53/35
See application file for complete search history.

(56) References Cited

U.S. PATENT DOCUMENTS 6,330,837 B1 12/2001 Charles et al.
2013/0076902 A1 3/2013 Gao
(Continued)

FOREIGN PATENT DOCUMENTS

CN 207000208 U 2/2018
CN 108155700 A 6/2018
(Continued)

OTHER PUBLICATIONS

International Search Report dated Jan. 17, 2022 (Application No. PCT/NL2021/050613).

*Primary Examiner* — Robert Grant
(74) *Attorney, Agent, or Firm* — The Dobrusin Law Firm, P.C.

(57) ABSTRACT

Device (1) for moving a connector (3) of an electric vehicle charger, comprising: an actuated mechanism, for moving an actuator attachment point (2) for the suspension of the connector (3), a connector attachment point (27), for the connector (3), the connector (3) provided with one end (4) adapted for electrical and mechanical connection with a socket of an electric vehicle, by movement in a plug-in direction (D); a suspension, coupled to the actuator attachment point (2), and carrying the connector attachment point (27), wherein the suspension carries the connector attachment point (27) in a preferred orientation, from which the connector (3) is movable, in particular compliantly movable relative to the actuator attachment point (2) under application of a force exerted on the connector attachment point (27), wherein the connector attachment point (27) is at least rotatable about an axis of rotation at an angle not parallel and preferably perpendicular to the plug-in direction wherein the axis of rotation intersects an imaginary axis through the connector attachment point (27) in the plug-in direction (D) at a position located in a direction from the suspension at a distance beyond the connector attachment point (27), which (Continued)

distance is less than 5 metres, more preferably less than 4 metres and most preferably less than 3 metres.

20 Claims, 6 Drawing Sheets

(56)                     References Cited

U.S. PATENT DOCUMENTS

| 2018/0272882 | A1* | 9/2018 | Fontana | ................. B60L 53/60 |
| 2022/0194246 | A1 | 6/2022 | Van Der Weijde | |

FOREIGN PATENT DOCUMENTS

| CN | 110040020 | A | 7/2019 |
| CN | 111668658 | A | 9/2020 |
| WO | 99/10137 | A1 | 3/1999 |
| WO | 2020/222640 | A1 | 11/2020 |

* cited by examiner

DEVICE AND METHOD FOR MOVING A CONNECTOR OF AN ELECTRIC VEHICLE CHARGER

The present invention relates to a device for moving a connector of an electric vehicle charger. More in particular, the invention relates to a device for automatically plugging in a charger connector of a charger for electric vehicles to the socket on an electric vehicle.

Devices for this purpose are known in the art, amongst others from patent applications from the same applicant.

One challenge when plugging in a charger connector to a vehicle, is positioning the charger correctly with respect to the vehicle. Another challenge is to outline its orientation correctly, in order to facilitate a movement in a plug-in direction. Both challenges are made harder when the vehicle is not exactly standing still, or when people move in and out of the car.

Another challenge is that the freedom for the movement and volume of the charger and its actuated mechanism is restricted by various items such as the bodywork of the vehicle and parts of the inlet cover. Due to these surfaces the actuated mechanism has a restricted volume where it can maneuver. A complicating factor is that the design of the vehicle inlet section on cars can differ significantly for different brands and types. Increasing the accuracy usually leads to a loss of speed and an increased engineering effort and requirements on parts and thus increase of cost, so normally an acceptable balance between these two is chosen. In order to decrease the required accuracy, mechanical guidance surfaces may be applied, in particular rounded or truncated edges of the connector and converging receiving spaces of the socket, commonly referred to as chamfers. Within a certain margin, the connector may find its way into the socket without a very accurate position/orientation of the actuated mechanism.

But especially when the vehicle moves when it is tried to make a connection, mechanical guidance surfaces will not be able to compensate for the amplitude of movement, and even a risk of damaging the vehicle and/or charger occurs.

For that reason, it is known to make use of a compliance mechanism, to allow self-seeking of the connector, and for softening the collision between connector and vehicle. The compliance absorbs the collision or even impact between connector and the vehicle, and allows the connector to move along with the vehicle within certain boundaries once connected.

However, plugging the connector into the socket becomes more difficult when the compliance is very soft in general, and the self-seeking and/or guiding surfaces may not always be helpful when the connector tends to move away too easily.

It is a goal of the present invention to take away the above mentioned disadvantages, and/or to propose a useful alternative to the prior art.

The invention thereto proposes a device for moving a connector of an electric vehicle charger, comprising an actuated mechanism, for moving an attachment point for the suspension of the connector attachment point, said connector provided with one end adapted for electrical and mechanical connection with a socket of an electric vehicle, by movement in a plug-in direction, and a suspension, coupled to the actuator attachment point, and carrying the connector attachment point, wherein the suspension carries the connector attachment point in a preferred orientation, from which the connector attachment point compliantly moves relative to the actuated mechanism under application of a force exerted on the connector attachment point, wherein the connector attachment point is at least rotatable about an axis of rotation at an angle to the plug-in direction, wherein the axis of rotation intersects an imaginary axis through the connector attachment point in the plug-in direction at a position located in a direction from the suspension beyond the end of the connector attachment point.

Where reference is made to a connector, the term plug may be considered instead. Types of connectors that are commonly used nowadays are described in standards such as IEC 62196 and SAE J1772. The connectors and socket types in these standards are referred to as CCS-1, CCS-2, type-1, type-2, type-3, CHAdeMO and GB/T (also described in GB/T 20234.3). Other standardized EV charging connectors include for example the newly defined ChaoJi connector intended for use in the Chinese and Asian region, the Euro-Din according to DIN VDE 0623-589 which is used on low-voltage vehicles such as forklifts and the future HPCCV or MCS connector intended for use in heavy electric vehicles such as trucks and busses. In particular the CCS-2 type of connector and socket have gained popularity in Europe. Besides a multi-pole electric connection, the connector and the socket establish a mechanical connection, which ensures that the correct poles are paired, and keeps the electrical connection engaged during a charging performance. In order to maintain the mechanical connection, the connectors have a tight fit, that clamps the connector in the socket. The afore mentioned standards and connectors and sockets are in particular intended for placement in or on the vehicle body or carrosserie, and normally be placed at a side, or possibly on top of the vehicle. These connectors are not specifically intended for use below the vehicle, that is against or integrated in the vehicle bottom, or in or against its chassis. The (method according to the) present invention may therefore explicitly not be intended for connections under a vehicle and/or against the bottom or chassis of the vehicle.

Connectors according to the standard may have chamfers for guidance, and a "loose" fit in an initial phase of insertion into a socket. Nevertheless, inserting a standard electric-vehicle connector into a socket is usually a high-precision task which requires accurate positioning of the connector to be inserted. Additionally, in practical situations there can be unexpected pose (position/rotation) changes of the socket on the vehicle during the insertion or during the charging process (entering or exiting of people, loading and unloading of cargo, wind loads, etc.). In prior art devices, the connector attachment point either can be translated or is rotatable about an axis of rotation that intersects an imaginary axis in the plug-in direction through the connector attachment point at a position in or before the connector attachment point. Examples that show at least part of the above are documents US2013076902A1, WO9910137A1 or WO2020222640A1.

The term attachment point may evidently refer to an area having a surface instead of a discrete point in space. Rotatable means rotatable under influence of an external force or torque, without being blocked over at least a certain angle.

In the present invention, the axis of rotation intersects an imaginary axis through the connector attachment point in the plug-in direction at a position being located in a direction from the suspension beyond the end of the connector attachment point not being infinity, which means in other words that when plugging in, the axis of rotation is preceding or leading the connector attachment point.

The suspension itself is oriented essentially and preferably fully at a side of the connector attachment point remote from the side for the connector for electrical and mechanical connection with a socket of an electric vehicle. More in particular, no parts of the suspension extend in such way that they protrude further than a front face of the connector, defined as a plane touching the utmost point of the connector seen in a direction from the actuated mechanism at any possible orientation of the connector with respect to the actuated mechanism, wherein the plane is perpendicular to the direction from the actuated mechanism to the utmost point of the connector. In this case, a point may be a plane or an actual point or a group of points.

The actuated mechanism may be any known actuator, for instance a series or parallel robot actuator or the like and may also be referred to as actuator.

As a result of the axis of rotation preceding or leading the connector attachment point, the connector—when coupled—is enabled to follow a movement or change of orientation caused by touching the socket, in a way comparable to the suspension of shopping-cart-wheels, where the point of rotation is usually near the front of the connector. Additionally, when the connector is fixed to the socket during the charging process the vehicle could make effective rotations with an axis of rotation much further in front of the connector, and by extension much further from the connector attachment point.

The distance between the connector attachment point and the axis of rotation is preferably larger than 1 centimeter, but less than twice the maximal width of the electric vehicle. In other words, it is preferably larger than 1 centimeter, more preferably larger than 2 centimeter, and most preferably more than 3 centimeter. However, it is preferably less than 5 metres (approx. twice the allowed width for standard electrical vehicles), and more preferably less than 4 metres and most preferably less than 3 metres (approx. the allowed width for standard electrical vehicles). This range has been proved to be the most effective one for modeling and compensating the unexpected pose (position/rotation) differences or changes of the socket on the vehicle during the insertion process and during the charging process, produced not only in the proximity of the socket but all along the width of the car.

In a further embodiment, the connector attachment point is rotatable relative to the actuated mechanism about two axes of rotation, each at an angle to the plug-in direction and to each other, by exerting a force on the connector attachment point. The angles may preferably be straight angles, so that a symmetric orientation with respect to an expected plug-in orientation and position is enabled.

The connector attachment point may be rotatable relative to the actuated mechanism as part of a compound movement. Such compound movement may for instance comprise one or more arcuate or dish-shaped guides, which are curved about the afore mentioned axis or axes of rotation.

The suspension may further be arranged to be forced back into the preferred position when the force is eliminated. For that purpose, active means such as a controllable actuator may be present, or the suspension may for instance be adapted to urge the connector attachment point back to the preferred position under a spring action. The latter is a relatively simple and robust solution.

One example hereof is an embodiment wherein the suspension comprises three flexures, spring-loaded pistons or gas springs arranged in a triangular arrangement, each connected on a first side to the actuated mechanism and on a second side to the connector attachment point.

In an alternative embodiment the suspension comprises a hexapod. The hexapod may be a passive hexapod, which may be spring tensioned but does not comprise actuators. These latter two suspensions in particular allow to keep the suspension located completely behind the connector attachment point in the plug-in direction.

In a preferred embodiment, the suspension comprises a series compliance between the actuated mechanism and the suspension or between the suspension and the connector attachment point. This allows to introduce a compliance with a direction-dependent behaviour.

In a preferred embodiment, the series compliance has a lower spring constant than a resultant spring constant of the suspension in the plug-in direction. This allows to let the compliance assist in orienting a connector before it is actually plugged in, and prevents skewing or clamping of the connector in the socket when it is softly moved in the direction of or even pressed against the socket.

In yet a further embodiment, the device according to the invention comprises at least one sensor for detecting a deflection of the connector attachment point in at least one direction. Such sensor may be used to indirectly determine contact of the connector with the socket of the vehicle or another collision, and it may be used to determine motion of the vehicle. A signal generated by this sensor may be used by a controller of the device in order to reposition the connector, and/or to iterate a positioning or movement sequence or protocol.

In yet a further embodiment, the suspension is provided with three compliant rotational degrees of freedom, and with at least one compliant translational degree of freedom. More preferably, the suspension is provided with three compliant rotational degrees of freedom, and with at least two compliant translational degrees of freedom.

The compliance or composed compliance obtained by series connection of a series compliance may be adapted to for a unidirectional compliance by having a rest position wherein at least part of the suspension is pre-tensioned against an end stop.

The invention will now be elucidated into more detail with reference to the following figures, wherein.

Figure 1A:
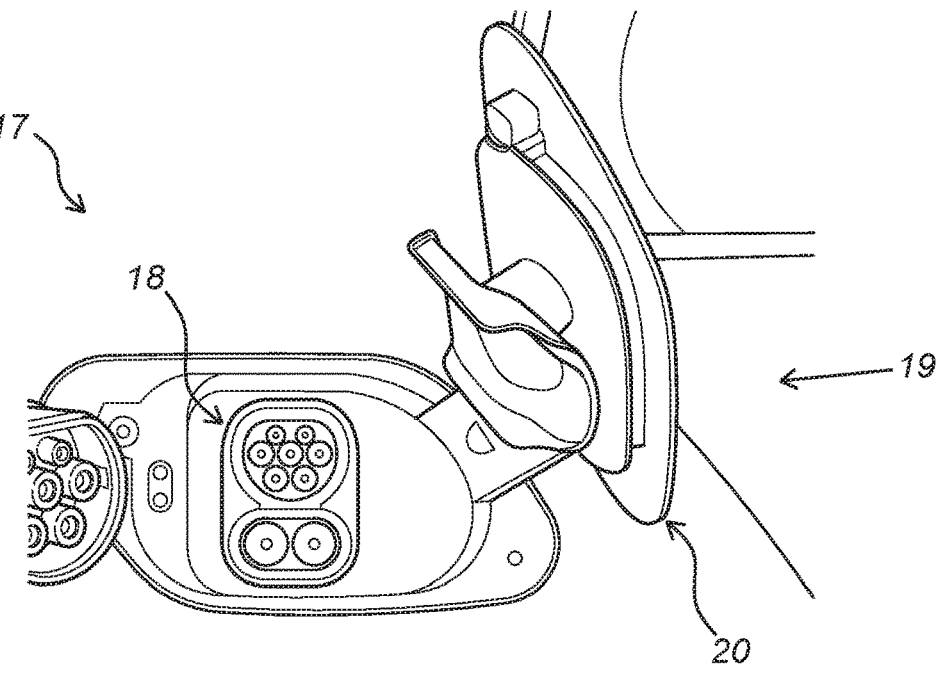
FIG. 1a shows a perspective view of a vehicle inlet section.

FIG. 1a shows a perspective view 17 of a vehicle inlet section 18, according to the state of the art. As visible in the figure, the freedom for the movement and volume of an actuated mechanism for moving a connector is restricted by various items such as the bodywork 19 of the vehicle and parts of the inlet cover 20. Due to these surfaces the actuated mechanism has a restricted volume where it can maneuver.

A complicating factor is that the design of the vehicle inlet section on cars can differ significantly for different brands and types.

Figure 1B:
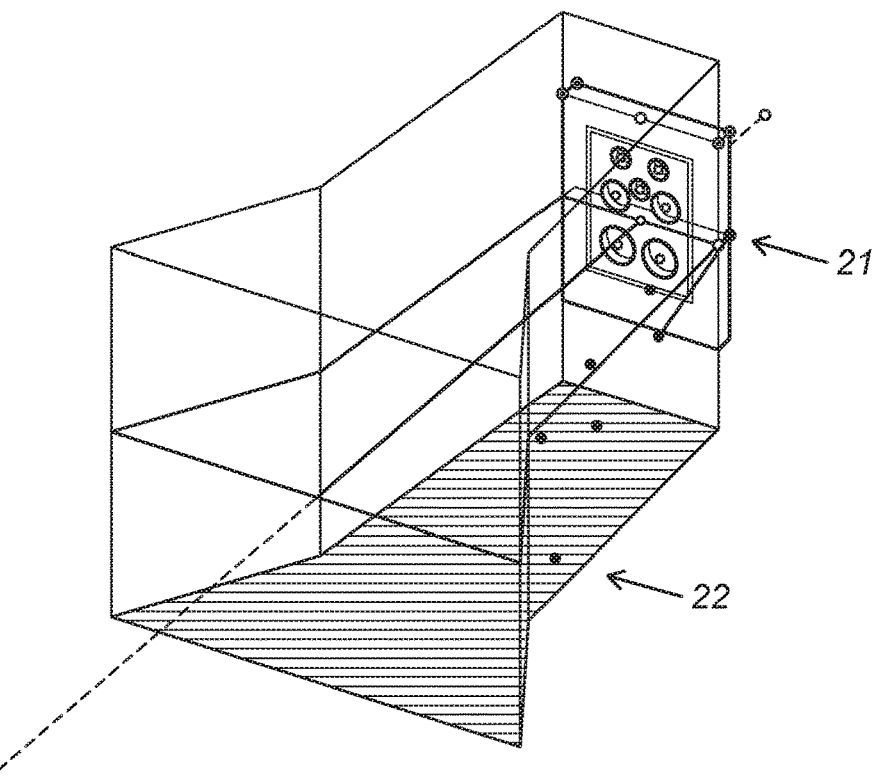
FIG. 1b shows a coarse model of available movement space around an inlet, when taking multiple vehicles into account.

FIG. 1*b* shows the result of measurements of the geometry of various inlet sections and charge port covers of different types of vehicles In order to define the free space available for manoeuvring the actuated mechanism one can and establish a three-dimensional volume representing the space where the actuated mechanism can maneuver taking into account the restrictions of the bodywork of the various vehicles. This figure shows that there are significant restrictions to the volume the actuated mechanism can occupy. There is significant free space available in the insertion direction, however on the sides and above and below the inlet, the space is limited. Therefore ideally the automated system occupies a limited volume on the sides and above and underneath the actual connector. This is a complicating factor in order to design a compliance assembly. In the figure, a plane of the vehicle inlet 21 is shown, as well as a volume available for an actuated mechanism 22.

Figure 2:
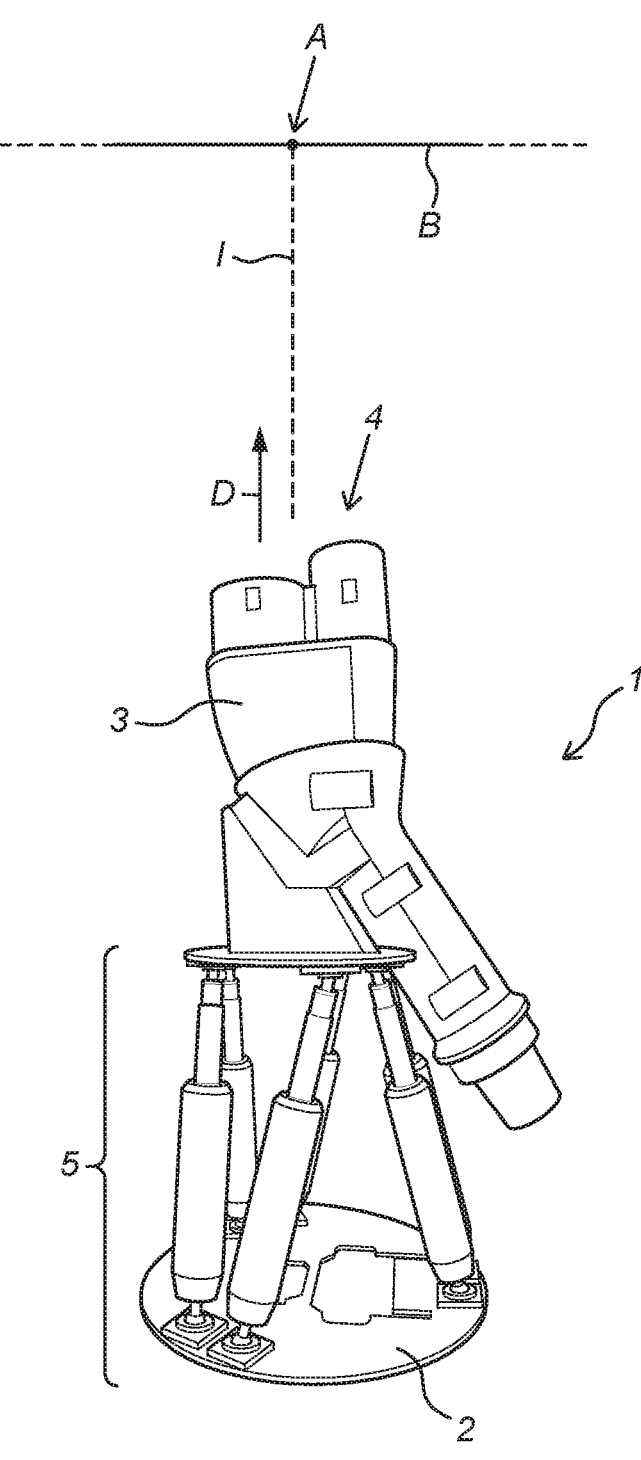
FIG. 2 shows a perspective view of a first embodiment of the invention in a first position.

FIG. 2 shows a device for moving a connector 3 of an electric vehicle charger, comprising an actuated mechanism (not shown), for moving an actuator attachment point 2 for the suspension of the connector 3. The connector 3 is provided with one end 4 adapted for electrical and mechanical connection with a socket of an electric vehicle, by movement in a plug-in direction D; The device 1 is provided with a suspension 5, coupled to the actuator attachment point 2, and carrying the connector 3. In the figure, the suspension 5 carries the connector 3 in a preferred orientation, from which the connector 3 is rotatable relative to the actuator attachment point under application of a force exerted on the connector 3. The connector is at least rotatable about an axis of rotation A (perpendicular to the plane of the drawing) and perpendicular to the plug-in direction D (explained in more detail in FIG. 5). The axis of rotation intersects an imaginary axis I through the connector 3 in the plug-in direction D at a position located in a direction from the suspension beyond the end 4 of the connector 3.

The connector 3 is further rotatable relative to the actuator attachment point by exerting a force exerted on the connector about a second axis of rotation B, perpendicular to the plug-in direction D and the first axis of rotation A. The connector 3 is rotatable relative to the actuated mechanism as part of a compound movement, allowed by the hexapod comprised by the suspension 5. The hexapod is a passive hexapod, which may be spring tensioned but does not comprise actuators.

Figure 3:
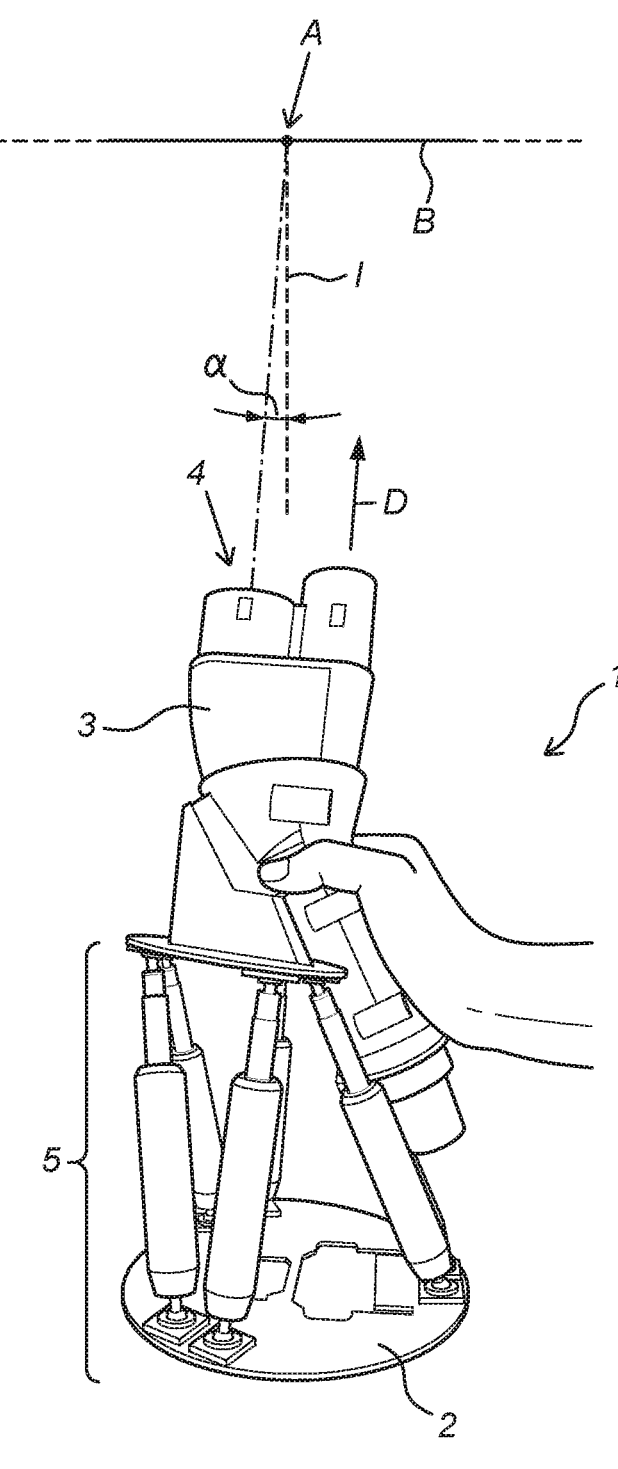
FIG. 3 shows a perspective view of a first embodiment of the invention in a second position.

FIG. 3 shows the device from FIG. 2, now rotated about an angle alpha about the axis of rotation A.

Figure 4:
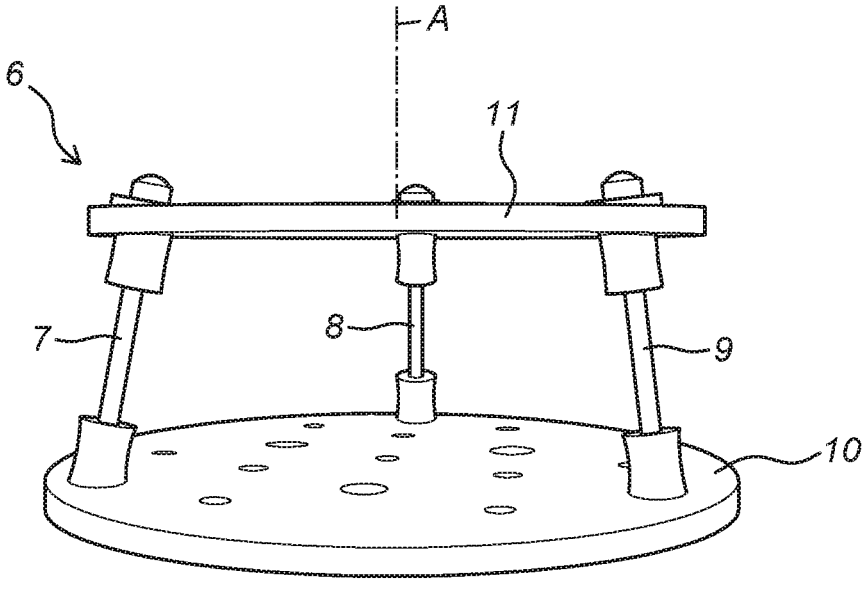
FIG. 4 shows a perspective view of a suspension according to a second embodiment according to the present invention in a first position.

FIG. 4 shows an alternative suspension 6 according to the present invention comprising three flexures 7, 8, 9 arranged in a triangular arrangement, each for connection at a first side to the actuator attachment point 10 and on a second side to the connector (not shown). Instead, a connector carrying point 11 is shown.

Figure 5:
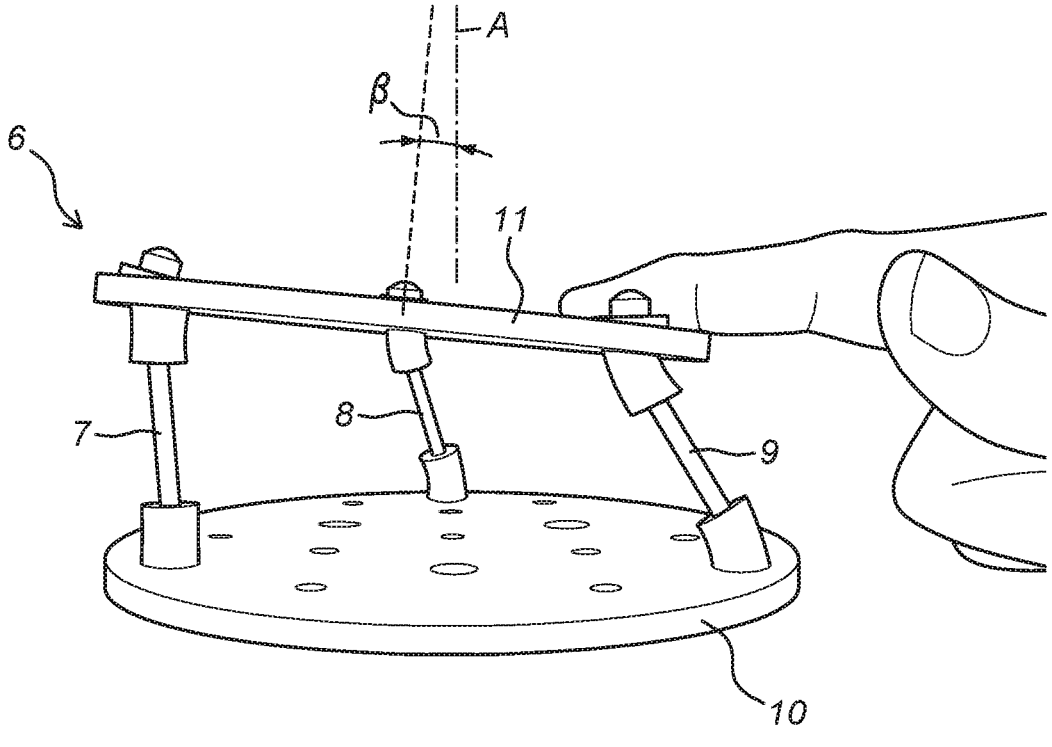
FIG. 5 shows a perspective view of a suspension according to a second embodiment according to the present invention in a second position.

FIG. 5 shows the suspension 6 from FIG. 3, in an orientation wherein it is rotated over an angle beta about axis of rotation A with respect to the orientation from FIG. 3.

Figure 6:
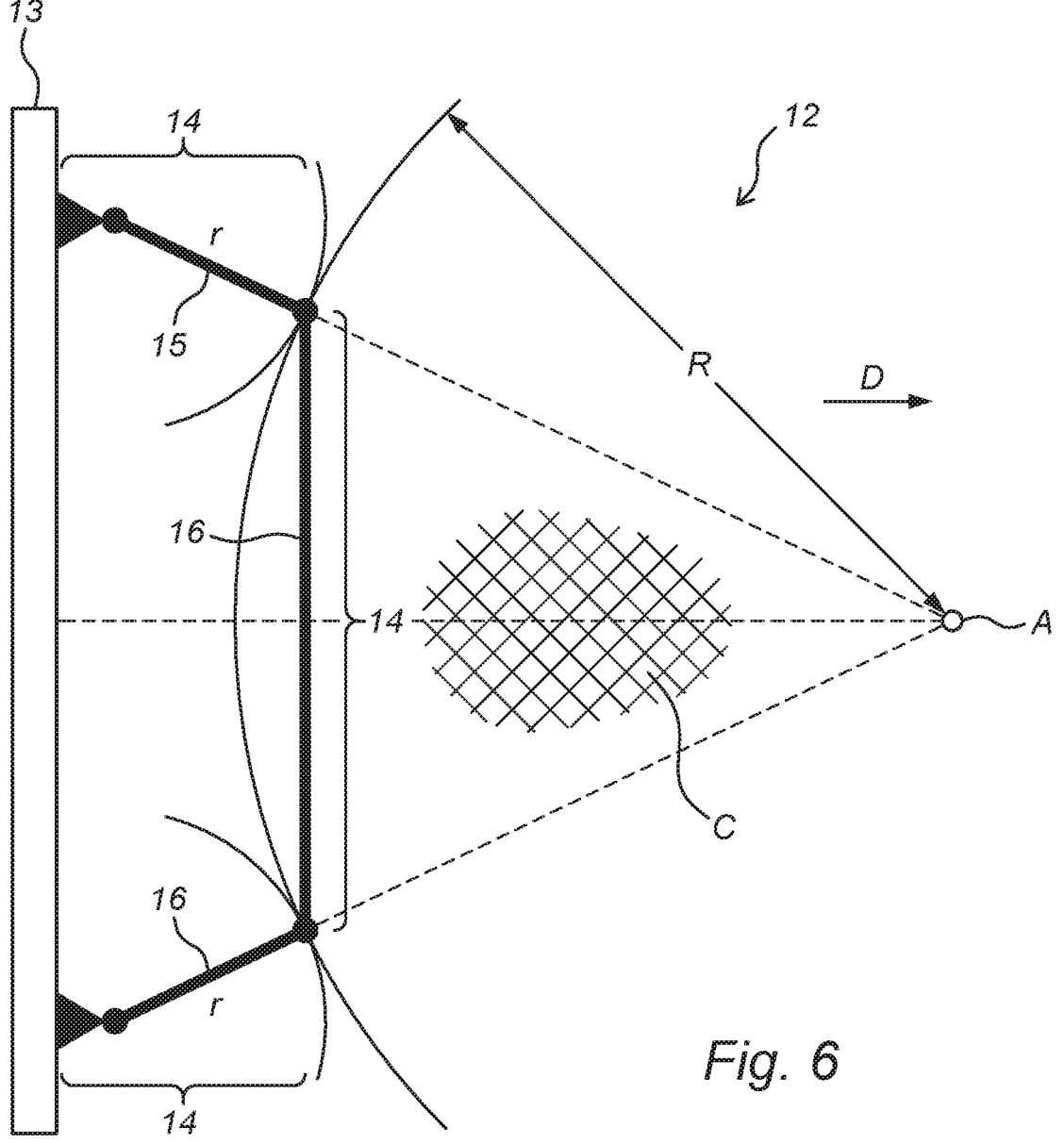
FIG. 6 shows a mathematical model of a suspension according to the invention, and a resulting axis of rotation.

FIG. 6 shows a schematic view 12 of the mechanics of a device for moving a connector of an electric vehicle charger, with an attachment point 13 for the suspension 14 of the connector. The suspension comprises legs 15 and 60, both coupled to a connector carrying point 16 at a mutual distance. Although the legs each have a relative small length r, the connector (carrying point 16) is rotatable with a radius R about an axis of rotation A that is perpendicular to the plug-in direction D.

From the figure it is clearly visible that the suspension comprises rotational parts, formed by legs 15 and 16, that are located behind the connector seen in the plug-in direction D, which connector is located in the area C. The effective rotation caused by the compound movement however has a larger radius R and its axis of rotation A is in front of the connector located in area C.

Figure 7:
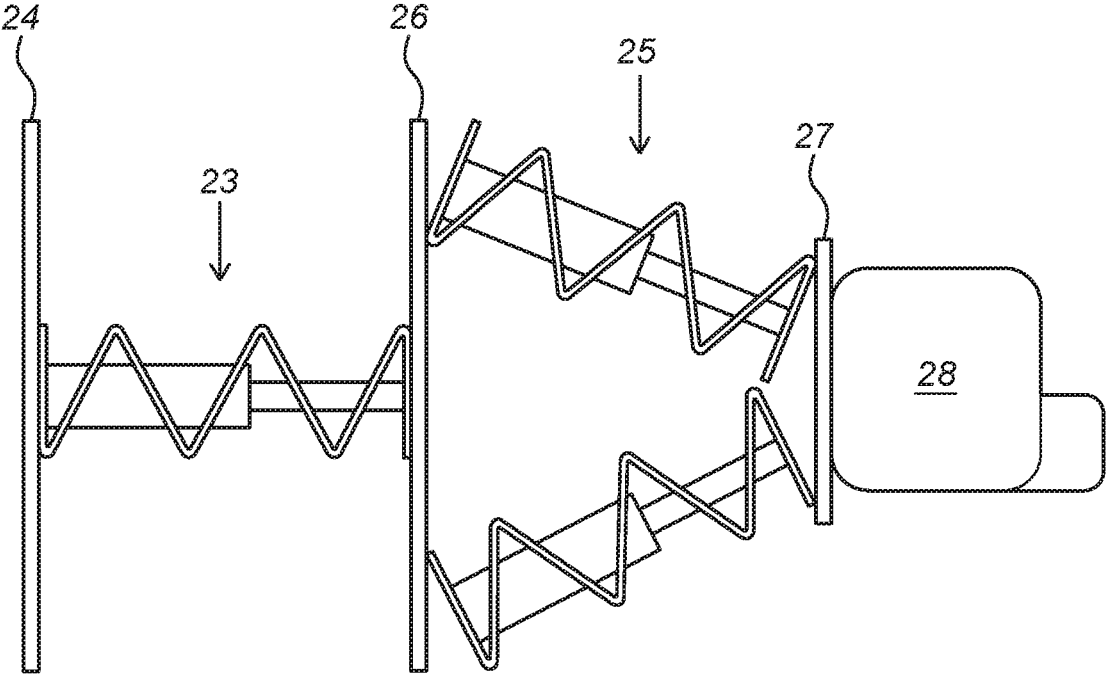
FIG. 7 shows a mathematical model of an embodiment of the invention with a series compliance.

FIG. 7 shows a mathematical model of an embodiment of the invention with a series compliance, having a series compliance 23, an actuator attachment point 24, a suspension formed by a hexapod 25, forming a parallel mechanism with non-aligned struts, a hexapod attachment point 26, and a connector attachment point 27. From the figure it becomes clear that in this embodiment, the suspension is coupled to the actuator attachment point by means of the series compliance 23. Ideally, the stiffness and preload of the struts and series compliance are configured such, that only when exceeding half of the stroke of the series compliance when applying a force on the connector in the plug-in direction, the preload of the hexapod is exceeded. The preload of individual struts of the hexapod may be exceeded before that, when the force on the connector is at an angle with respect to the plug-in direction.

The invention claimed is:

1. A device for moving a connector of an electric vehicle charger, comprising:

an actuated mechanism, for moving an actuator attachment point for the suspension of the connector, a connector attachment point, for the connector, the connector provided with one end adapted for electrical and mechanical connection with a socket of an electric vehicle, by movement in a plug-in direction;

a suspension, coupled to the actuator attachment point, and carrying the connector attachment point;

wherein the suspension carries the connector attachment point in a preferred orientation, from which the connector is movable, in particular compliantly movable relative to the actuator attachment point under application of a force exerted on the connector attachment point, wherein the connector attachment point is at least:

rotatable about an axis of rotation at an angle not parallel and preferably perpendicular to the plug-in direction;

wherein:

the axis of rotation intersects an imaginary axis through the connector attachment point in the plug-in direction at a position located in a direction from the suspension at a distance beyond the connector attachment point, which distance is less than 5 metres, more preferably less than 4 metres and most preferably less than 3 metres;

wherein a series compliance between the actuated mechanism and the suspension or between the suspension and the connector attachment point, wherein the series compliance has a lower spring constant than a resultant spring constant of the suspension in the plug-in direction, and/or wherein a stiffness and preload of suspension (5) and series compliance are configured such, that only when exceeding half of the stroke of the series compliance when applying a force on the connector attachment point in the plug-in direction (D), a preload of the suspension is exceeded.

2. The device according to claim 1, wherein the connector attachment point is rotatable relative to the actuated mechanism about two axes of rotation, by exerting a force on the connector attachment point, each at an angle not parallel and preferably rectangular to the plug-in direction and to each other.

3. The device according to claim 1, wherein the connector attachment point is rotatable relative to the actuator attachment point as part of a compound movement.

4. The device according to claim 1, wherein the suspension comprises one or more arcuate or dish-shaped guides.

5. The device as claimed in claim 1, arranged to be forced back into the preferred position when the force is eliminated.

6. The device according to claim 4, wherein the suspension is adapted to urge the connector attachment point back to the preferred position under a spring or spring like stiffness, for instance a multi-degree-of-freedom flexure.

7. The device according to claim 4, wherein the suspension comprises at least three kinematically parallel compliant elements, like flexures, spring-loaded pistons or gas springs, arranged in a triangular arrangement, each connected on a first side to the actuated mechanism and on a second side to the connector attachment point.

8. The device according to claim 6, wherein the suspension comprises a passive Stewart platform.

9. The device as claimed in claim 1, wherein the suspension (5) is located completely behind the connector attachment point in the plug-in direction.

10. The device according to claim 1, comprising at least one sensor for detecting a deflection of the connector attachment point in at least one degree of freedom.

11. The device according to claim 1, wherein the suspension is provided with three compliant rotational degrees of freedom, and with at least one compliant translational degree of freedom.

12. The device according to claim 1, wherein the suspension is provided with three compliant rotational degrees of freedom, and with two compliant translational degrees of freedom.

13. The device according to claim 1, wherein a connector is coupled to the connector attachment point, the connector provided with one end adapted for electrical and mechanical connection with a socket of an electric vehicle, by movement in a plug-in direction.

14. A method for moving a connector of an electric vehicle charger, the connector provided with one end adapted for electrical and mechanical connection with a socket of an electric vehicle, by movement in a plug-in direction, the method comprising the steps of:

moving the connector in a preferred orientation by means of an actuated mechanism coupled to a suspension carrying the connector, applying a force to the connector, rotating, in particular compliantly rotating, the connector using the suspension about an axis of rotation at an angle not parallel and preferably perpendicular to the plug-in direction;

wherein the axis of rotation intersects an imaginary axis through the connector in the plug-in direction at a position located at a distance in a direction from connector, which distance is less than 5 metres, more preferably less than 4 metres and most preferably less than 3 metres wherein a series compliance is positioned between the actuated mechanism and the suspension or between the suspension and the connector attachment point and wherein the series compliance has a lower spring constant than a resultant spring constant of the suspension in the plug-in direction, and/or wherein a stiffness and preload of suspension and series compliance are configured such, that only when exceeding half of the stroke of the series compliance when applying a force on the connector attachment point in the plug-in direction, a preload of the suspension is exceeded.

15. The method according to claim 14, wherein the connector is rotated about two axes of rotation, by exerting a force on the connector, each axis at an angle not parallel and preferably rectangular to the plug-in direction and to each other.

16. The method according to claim 14, wherein the connector is rotated as part of a compound movement.

17. The method according to claim 14, comprising forcing the connector back into a preferred position when the force is eliminated.

18. The method according to claim 14, comprising urging the connector back to the preferred position under a spring or spring like stiffness.

19. The method according to claim 14, comprising suspending the connector with three compliant rotational degrees of freedom, and with at least one compliant translational degree of freedom.

20. The method according to claim 17, comprising suspending the connector with three compliant rotational degrees of freedom, and with two compliant translational degrees of freedom.

* * * * *